(12) United States Patent
Athalye

(10) Patent No.: US 8,504,119 B2
(45) Date of Patent: Aug. 6, 2013

(54) METHOD FOR EFFICIENT ASSESSMENT OF COMMUNICATION SERVICE LEVELS IN A MOBILE STATION HAVING MULTIPLE COMMUNICATION INTERFACES

(75) Inventor: Sanjeev Arvind Athalye, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 711 days.

(21) Appl. No.: 11/621,394

(22) Filed: Jan. 9, 2007

(65) Prior Publication Data

US 2008/0167090 A1    Jul. 10, 2008

(51) Int. Cl.
H04B 1/38    (2006.01)

(52) U.S. Cl.
USPC ......... 455/574; 370/311; 370/338; 455/552.1

(58) Field of Classification Search
USPC ............... 455/574, 561, 226.2, 434, 435.3, 455/513, 515, 556.1, 556.2; 370/329, 335, 370/342, 468, 338, 311
See application file for complete search history.

(56) References Cited

U.S. PATENT DOCUMENTS

| | | | |
|---|---|---|---|
| 5,794,148 | A | 8/1998 | Mamaghani et al. |
| 6,185,422 | B1 | 2/2001 | Mattila |
| 6,185,435 | B1 | 2/2001 | Imura |
| 6,335,922 | B1 | 1/2002 | Tiedemann, Jr. et al. |
| 6,393,006 | B1 | 5/2002 | Kajihara |
| 6,801,777 | B2 | 10/2004 | Rusch |
| 7,054,634 | B2 | 5/2006 | Watanabe et al. |
| 7,117,008 | B2 | 10/2006 | Bajikar |
| 7,180,876 | B1 * | 2/2007 | Henry et al. ............. 370/329 |
| 7,266,389 | B2 | 9/2007 | Karaoguz et al. |
| 7,434,076 | B1 | 10/2008 | Altounian et al. |
| 7,508,782 | B2 * | 3/2009 | Morimoto ............... 370/311 |
| 2005/0009530 | A1 | 1/2005 | Rouffet et al. |

(Continued)

FOREIGN PATENT DOCUMENTS

| | | |
|---|---|---|
| EP | 1496719 | 1/2005 |
| EP | 1613108 | 1/2006 |

(Continued)

OTHER PUBLICATIONS

International Search Report—PCT/US2008/050531, International Search Authority—European Patent Office—Jun. 30, 2008.

(Continued)

Primary Examiner — Wesley Kim
Assistant Examiner — Dinh Nguyen
(74) Attorney, Agent, or Firm — Rupit M. Patel

(57) ABSTRACT

A method of providing communication services for a mobile station having a plurality of communication interfaces is disclosed. Each communication interface has an active power mode and an inactive power mode. The power consumption of a communication interface in the active power mode is greater than in the inactive power mode. In the method, a first communication interface is activated based on power characteristics of the first communication interface with respect to the plurality of communication interfaces. A communication service level of the activated first communication interface is assessed for a first predetermined time period. The first communication interface is then deactivated. A second communication interface is activated based on power characteristics of the second communication interface with respect to the plurality of communication interfaces. A communication service level of the activated second communication interface is assessed for a second predetermined time period. The second communication interface is then deactivated.

20 Claims, 7 Drawing Sheets

U.S. PATENT DOCUMENTS

| | | | |
|---|---|---|---|
| 2005/0059395 | A1 | 3/2005 | Park |
| 2005/0078633 | A1 | 4/2005 | Watanabe et al. |
| 2005/0255878 | A1 | 11/2005 | Leinonen et al. |
| 2006/0116127 | A1 | 6/2006 | Wilhoite et al. |
| 2006/0178147 | A1 | 8/2006 | Jagadeesan et al. |
| 2007/0297373 | A1* | 12/2007 | Saifullah et al. ............. 370/338 |
| 2008/0070566 | A1 | 3/2008 | Athalye |
| 2008/0080419 | A1* | 4/2008 | Cole ............................ 370/329 |

FOREIGN PATENT DOCUMENTS

| | | |
|---|---|---|
| EP | 1679917 | 7/2006 |
| JP | 10164654 | 6/1998 |
| JP | 2002112347 A | 4/2002 |
| JP | 2003318765 A | 11/2003 |
| JP | 2005094772 A | 4/2005 |
| JP | 2005110072 A | 4/2005 |
| JP | 2005522087 A | 7/2005 |
| JP | 2005303465 A | 10/2005 |
| JP | 2005339141 A | 12/2005 |
| JP | 2006501773 A | 1/2006 |
| KR | 2006081962 | 7/2006 |
| TW | I268718 | 12/2006 |
| TW | I269549 | 12/2006 |
| WO | 03084095 | 10/2003 |
| WO | 2004032560 A1 | 4/2004 |
| WO | 2006096295 | 9/2006 |
| WO | 2008036608 | 3/2008 |

OTHER PUBLICATIONS

Written Opinion—PCT/US2008/050531, International Search Authority—European Patent Office—Jun. 30, 2008.

Shiao-Li, T. et al: "Reducing idle mode power consumption of cellular/VoWLAN dual mode mobiles" Global Telecommunications Conference 2005, Globecom '05. IEEE St. Loius, MO, USA Nov. 28-Dec. 2, 2005, Piscataway, NJ, USA IEEE, vol. 5, Nov. 28, 2005, pp. 2902-2906, XP010879251.

Agarwal et al., "On Demand Paging Using Bluetooth Radios on 802.11 Based Networks", CECS Technical Report #03-22, Jul. 2003. http:www.bluesoleil.com/support/index.asp?topic=bluetooth_questions.

3GPP2-C.S0002-C v1.0, "Physical Layer Standard for cdma2000 Spread Spectrum Systems", (TR 45.5), Revision D, Sep. 2005.

ETSI TS 125 211 v7.0.0; "Universal Mobile Telecommunications System (UMTS); Physical channels and mapping of transport channels onto physical channels (FDD)", 3GPP TS 25.211 version 7.0.0 Release 7 (Mar. 2006).

ETSI TS 125 212 v7.1.0; "Universal Mobile Telecommunications System (UMTS); Multiplexing and channel coding (FDD)", 3G TS 25.212 version 7.1.0 Release 7 (Jun. 2006).

ETSI TS 125 213 v7.0.0; "Universal Mobile Telecommunications System (UMTS); Spreading and modulation (FDD)", 3G TS 25.213 version 7.0.0 Release 7 (Mar. 2006).

ETSI TS 125 214 v7.1.0; "Universal Mobile Telecommunications System (UMTS); Physical layer procedures (FDD)", 3G TS 25.214 version 7.1.0 Release 7 (Jun. 2006).

TIA/EIA/-95-B; "Mobile Station-Base Station Compatibility Standard for Dual-Mode Wideband Spread Spectrum Cellular System", Mar. 1999.

Taiwan Search Report—TW097100901—TIPO—Jun. 16, 2011.

* cited by examiner

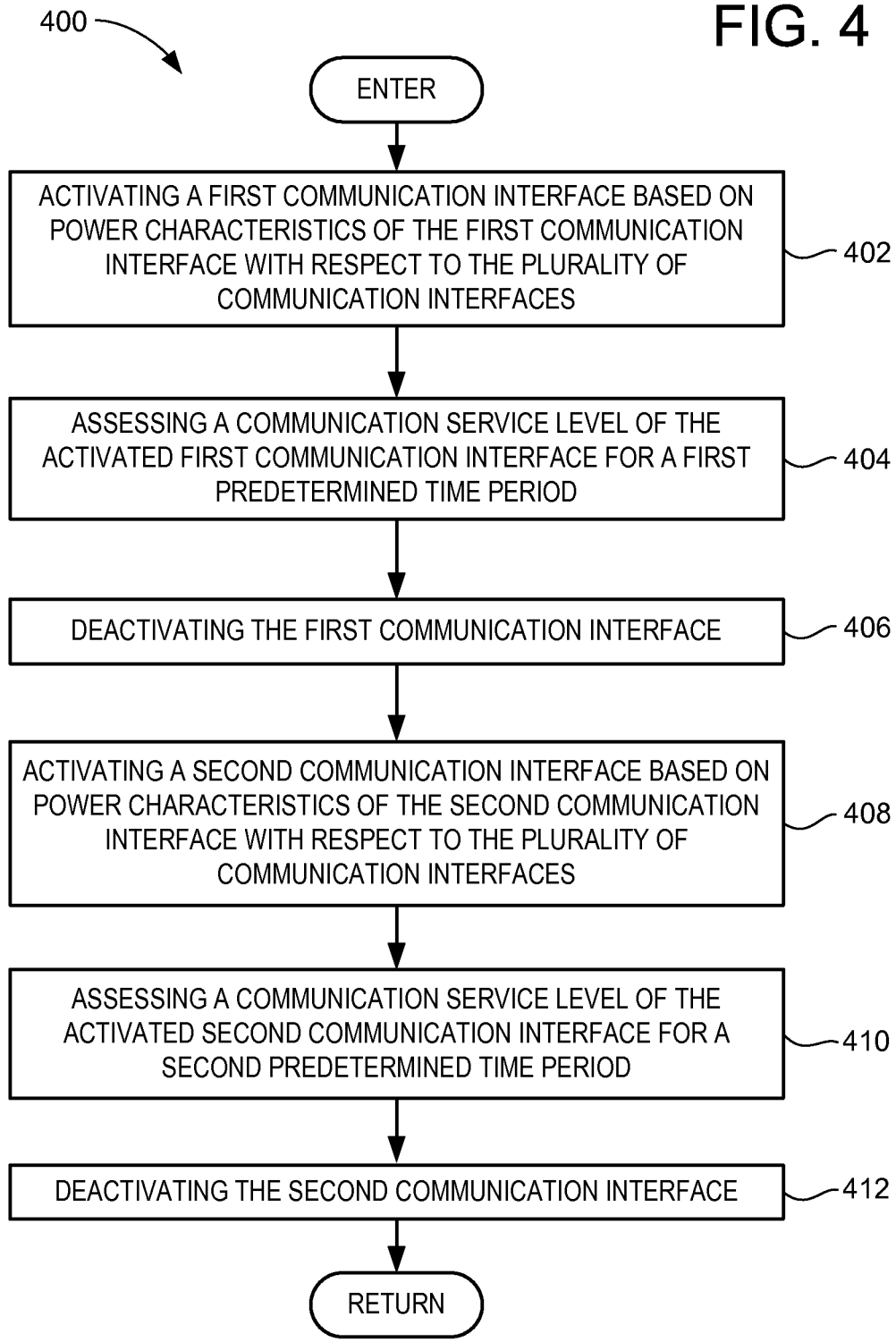

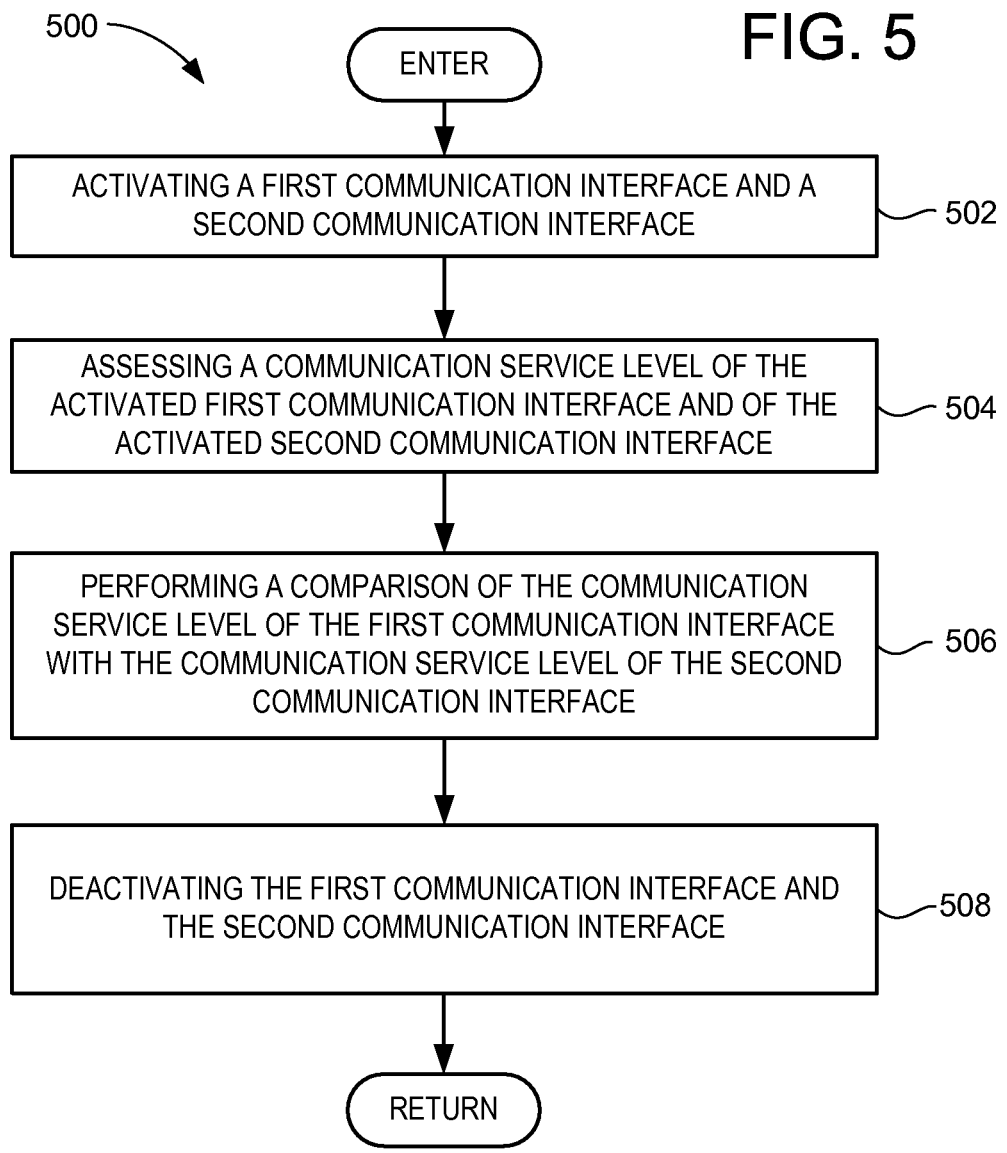

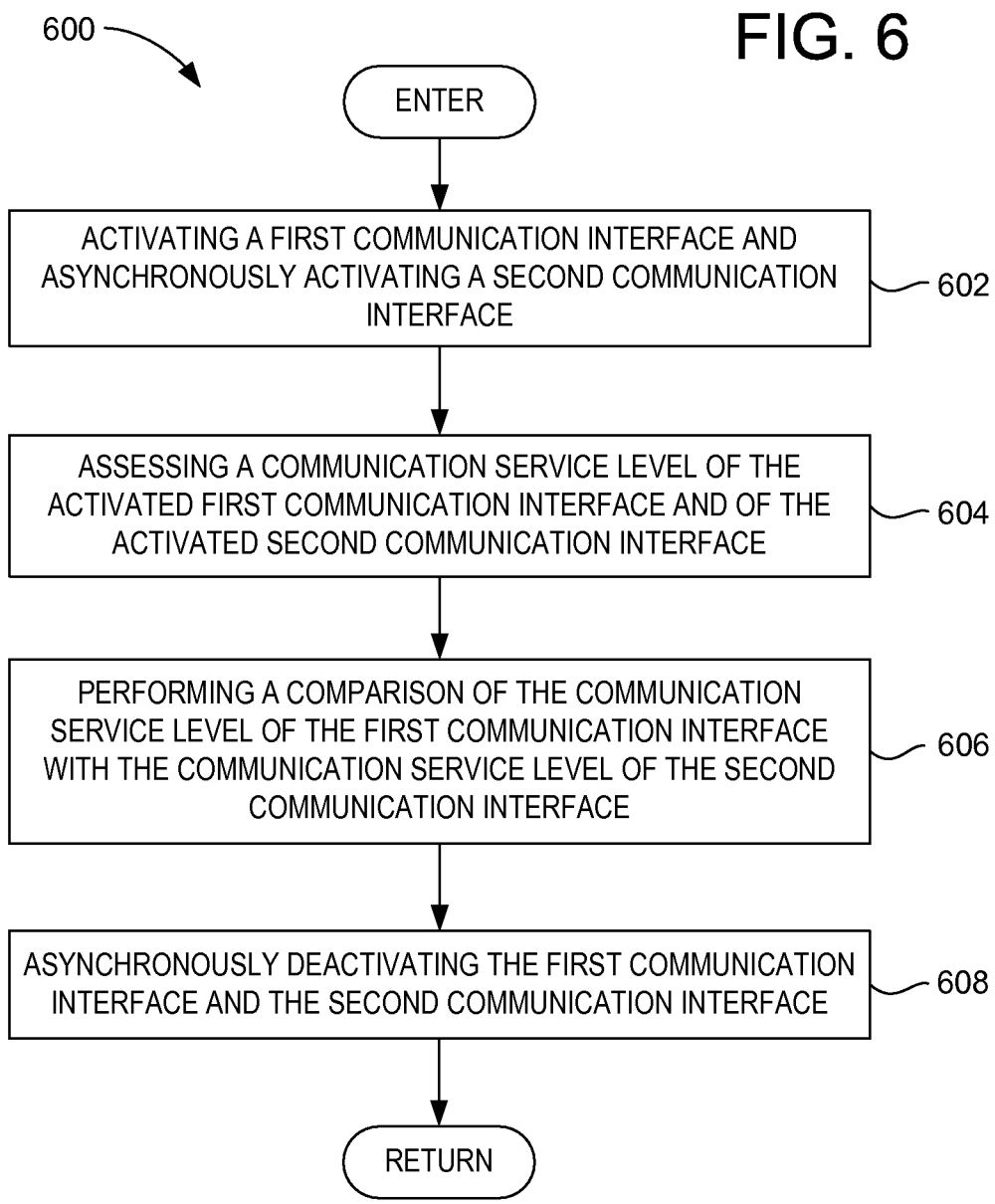

METHOD FOR EFFICIENT ASSESSMENT OF COMMUNICATION SERVICE LEVELS IN A MOBILE STATION HAVING MULTIPLE COMMUNICATION INTERFACES

BACKGROUND

1. Field

The present invention relates generally to wireless communication, and more specifically to cellular wireless communication.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (3) the standard offered by a consortium named "3rd Generation Partnership Project 2" (3GPP2) and embodied in "TR-45.5 Physical Layer Standard for cdma2000 Spread Spectrum Systems" (the IS-2000 standard).

In the above named CDMA communication systems and standards, the available spectrum is shared simultaneously among a number of users, and suitable techniques are available to provide services, such as voice and data services.

Typical mobile subscribers use a mobile station such as a mobile phone or a laptop to access the wireless communication system. A mobile station may have several communication interfaces that support differing media types or access techniques. Energy or power constraints may dictate that the mobile station's unused communication interfaces be deactivated. Existing techniques may require user intervention or coordination with a base station in order to reactivate an inactive communication interface. There is therefore a need in the art for a mobile station configured to employ techniques for efficiently activating and assessing the communication service level of an inactive communication interface.

SUMMARY

An aspect of the present invention may reside in a method of providing communication services for a mobile station having a plurality of communication interfaces. Each communication interface has an active power mode and an inactive power mode. The power consumption of a communication interface in the active power mode is greater than the power consumption of the communication interface in the inactive power mode. In the method, a first communication interface is activated based on power characteristics of the first communication interface with respect to the plurality of communication interfaces. A communication service level of the activated first communication interface is assessed for a first predetermined time period. The first communication interface is then deactivated. A second communication interface is activated based on power characteristics of the second communication interface with respect to the plurality of communication interfaces. A communication service level of the activated second communication interface is assessed for a second predetermined time period. The second communication interface is then deactivated.

In a more detailed aspect, the mobile station may be capable of assessing a communication service level of a communication interface in the active power mode and the mobile station is incapable of assessing a communication service level of a communication interface in the inactive power mode. Further, a comparison of the communication service level of the first communication interface with the communication service level of the second communication interface may be performed, and a communication interface may be selected based on the comparison of communication service levels. Additionally, the power characteristics may include the power consumption of the respective communication interface in comparison with the power consumption of another communication interface in the plurality of communication interfaces.

Another aspect of the invention may reside in a computer program product comprising computer-readable medium comprising code for causing a computer to implement the functions in the respective method.

Similarly, an aspect of the invention may reside in a mobile station including a plurality of communication interfaces. Each communication interface may have an active power mode and an inactive power mode. The power consumption of a communication interface in the active power mode is greater than the power consumption of the communication interface in the inactive power mode. The mobile station may further include means for activating a first communication interface based on power characteristics of the first communication interface with respect to the plurality of communication interfaces, means for assessing a communication service level of the activated first communication interface for a first predetermined time period, means for deactivating the first communication interface, means for activating a second communication interface based on power characteristics of the second communication interface with respect to the plurality of communication interfaces, means for assessing a communication service level of the activated second communication interface for a second predetermined time period, and means for deactivating the second communication interface.

Yet another aspect of the invention may reside in method of providing communication services for a mobile station having a plurality of communication interfaces. In the method, a first communication interface and a second communication interface may be activated. A communication service level of the activated first communication interface and of the activated second communication interface is assessed. A comparison is performed of the communication service level of the first communication interface with the communication service level of the second communication interface. The first communication interface and the second communication interface are then deactivated.

In more a detailed aspect, the first and second communication interfaces may be synchronously activated. Also, the first and second communication interfaces may be synchronously deactivated.

An aspect of the invention also may reside in method of providing communication services for a mobile station having a plurality of communication interfaces. In the method, a first communication interface is activated and a second communication interface is asynchronously activated. A communication service level of the activated first communication interface and of the activated second communication interface is assessed. A comparison is performed of the communication service level of the first communication interface with the communication service level of the second communication interface. The first communication interface and the second communication interface are then asynchronously deactivated.

In more a detailed aspect, the activation time periods of the first and second communication interfaces may be equal. Alternatively, the activation time periods of the first and second communication interfaces may not be equal. Additionally, the activation period time periods may be based on relative setup times for the first and second communications interfaces, or on a relative usage history for the first and second communications interfaces.

BRIEF DESCRIPTION OF THE DRAWINGS

FIG. 4 is a flow diagram of a method for efficiently assessing the communication service level of communication interfaces, in accordance with an aspect of the invention;

FIG. 5 is a flow diagram of another method for efficiently assessing the communication service level of communication interfaces, in accordance with an aspect of the invention;

FIG. 6 is a flow diagram of another method for efficiently assessing the communication service level of inactive communication interfaces, in accordance with an aspect of the invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
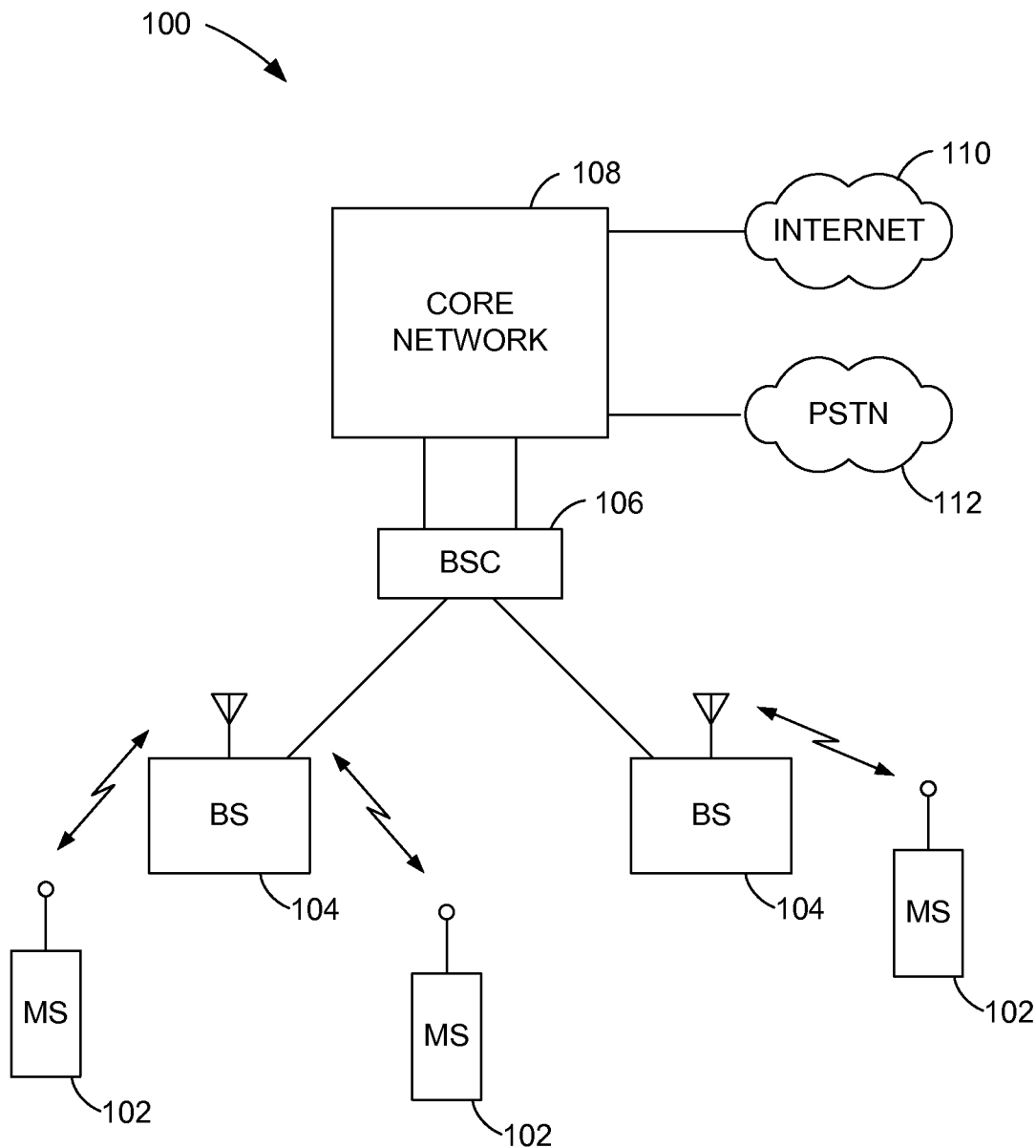
FIG. 1 is an example of a wireless communication system.

With reference to FIG. 1, a wireless communication system 100 includes one or more wireless mobile stations (MS) 102, one or more base stations (BS) 104, one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 2:
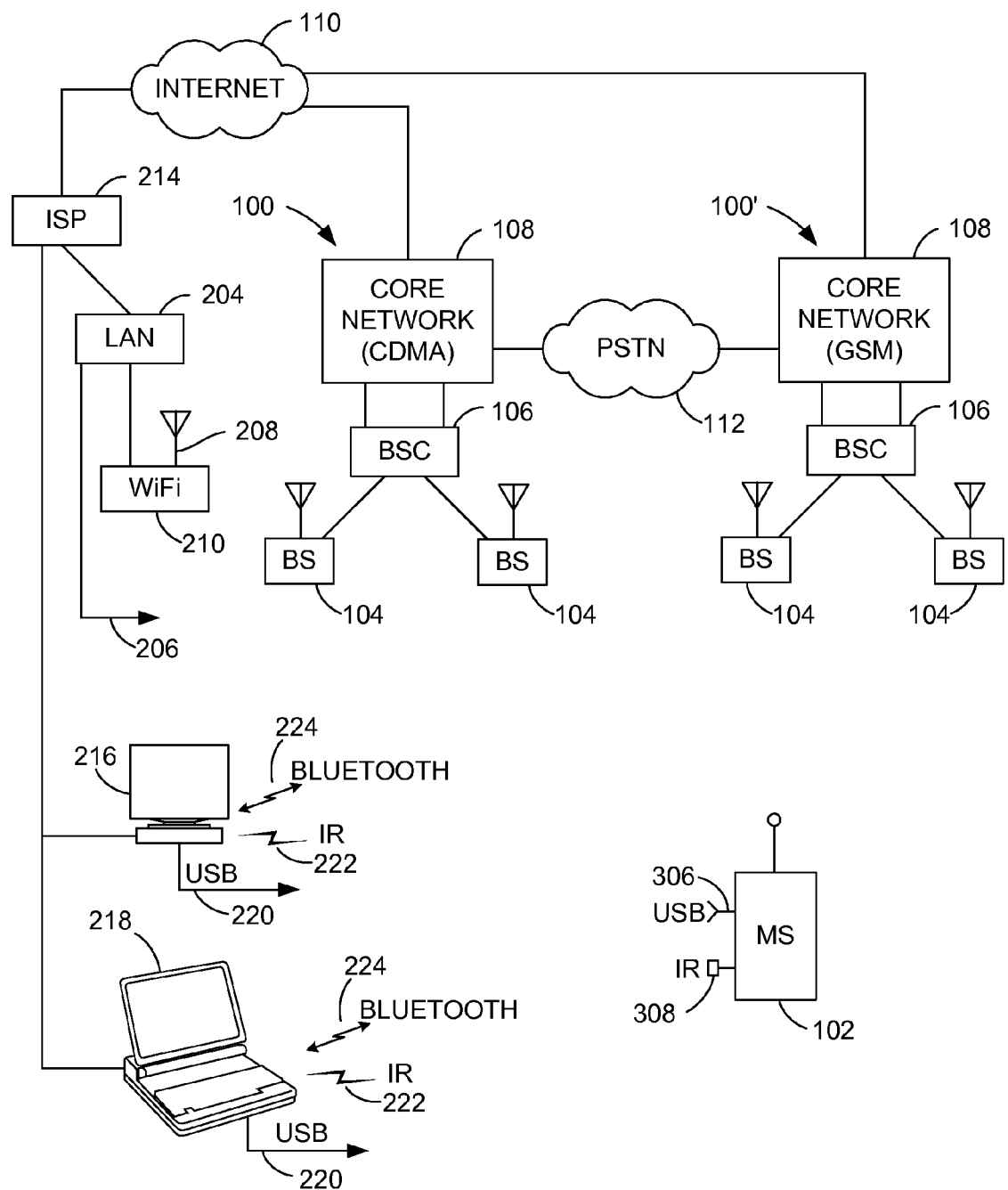
FIG. 2 is a block diagram of a mobile station having access to multiple access networks, in accordance with an aspect of the invention.

With reference to FIG. 2, a mobile subscriber may have access to multiple access networks that support differing media type or access techniques. More specifically, in addition to the wireless communication system 100 of FIG. 1, a mobile subscriber may have access to a local area network (LAN) 204 over a wired Ethernet connection 206, or over a wireless (WiFi) network connection 208 through an access point 210 based on an IEEE 802.11 standard. The LAN may be connected to the Internet through, for example, an internet service provider (ISP) 214. Also, the mobile subscriber may have access to a personal computer (PC) 216, or a laptop computer 218, having a Universal Serial Bus (USB) connection 220, an infrared (IR) connection 222, or a Bluetooth connection 224.

Also, the mobile subscriber may have access to another wireless communication system 100'. For example, a first communication system 100 may be based on the CDMA multiple access technique, and a second wireless communication system 100' may be based on the TDMA access technique, such as a Global System for Mobile Communications (GSM).

Figure 3:
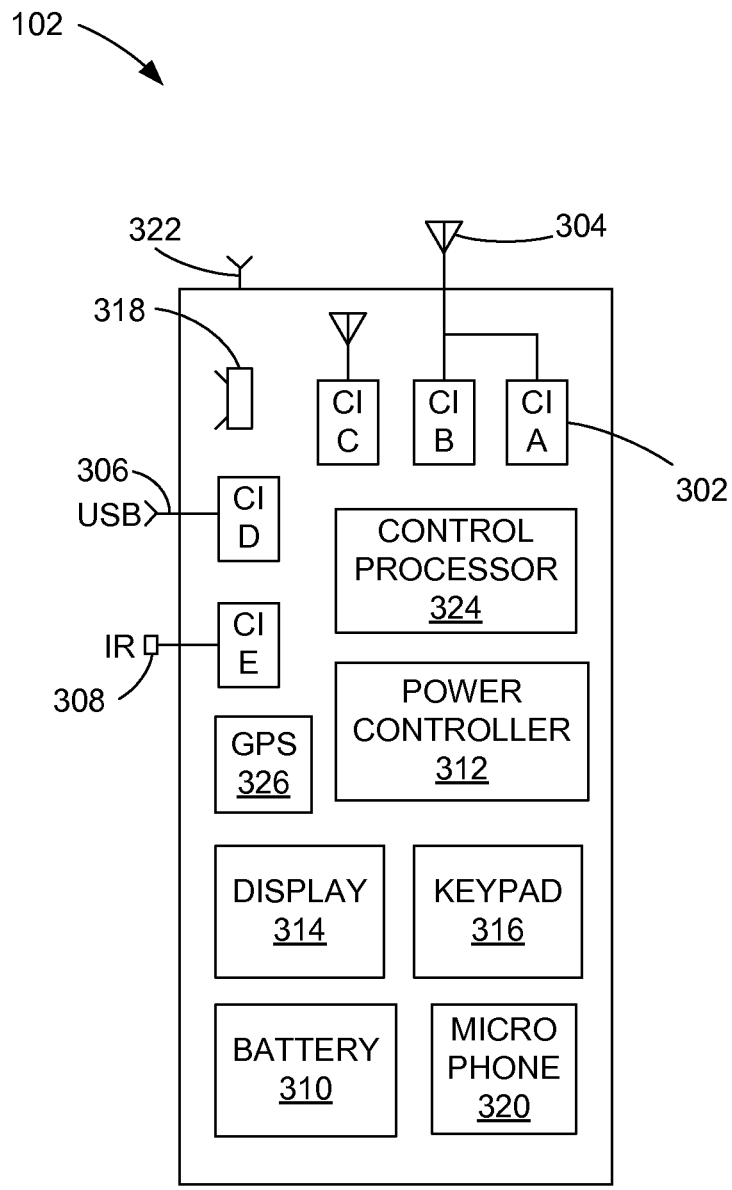
FIG. 3 is a block diagram of a mobile station having multiple communication interfaces, in accordance with an aspect of the invention.

With reference to FIG. 3, the mobile station 102 may have several communication interfaces (CI) 302. More specifically, the mobile station may have a communication interface A for communication with the CDMA-based wireless communication system 100, and another communication interface B for communication with the GSM-based wireless communication system 100'. These two communication interfaces may share a common antenna 304, or may have separate antennas (not shown). Also, the mobile station may have a communication interface C for communication with the WiFi access point 210, or with a Bluetooth connection 224. Further, the mobile station may have a communication interface D with a plug 306 for a direct wired connection through the Ethernet connection 206, or through the USB connection 220. Additionally, the mobile station may have a communication interface E for communication using an infrared (IR) optical transceiver 308.

The mobile station 102 has an internal battery 310 connected to a power control module 312. The power control module distributes the battery power to the communication interfaces 302. Each communication interface has an active mode in which full power is drawn from the battery, and an inactive mode in which little or no power is drawn from the battery. The mobile station also has a display 314, a keypad 316, a speaker 318, and a microphone 320. The mobile station may include a headphone jack 322. As the cost of memory decreases and processing power of a typical internal control processor 324 increases, more features and functions may be included in the mobile station. For example, the mobile station may be used to surf the World Wide Web, download and listen to music, download and view videos and movies, or determine geographic location using a Global Positioning Satellite (GPS) receiver 326.

With reference to FIG. 4, one aspect of the present invention may reside in a method 400 of providing communication services for the mobile station 102 having a plurality of communication interfaces 302. Each communication interface has an active power mode and an inactive power mode. The power consumption of a communication interface in the active power mode is greater than the power consumption of the communication interface in the inactive power mode. In the method, a first communication interface is activated based on power characteristics of the first communication interface with respect to the plurality of communication interfaces (step 402). A communication service level of the activated first communication interface is assessed for a first predetermined time period (step 404). The first communication interface is then deactivated (step 406). A second communication interface is activated based on power characteristics of the second communication interface with respect to the plurality of communication interfaces (step 408). A communication service level of the activated second communication interface is assessed for a second predetermined time period (step 410). The second communication interface is then deactivated (step 412).

In a more detailed aspect, the mobile station 102 may be capable of assessing a communication service level of a communication interface 302 in the active power mode and the mobile station may be incapable of assessing a communication service level of a communication interface in the inactive power mode. Further, a comparison of the communication service level of the first communication interface with the communication service level of the second communication interface may be performed, and a communication interface may be selected based on the comparison of communication service levels. Additionally, the power characteristics may include the power consumption of the respective communication interface in comparison with the power consumption of another communication interface in the plurality of communication interfaces.

The communication service level may be based on one of, or a combination of, traditional Quality of Service (QoS) metrics, radio frequency (rf) signal strength, financial cost, level of security provided, an explicit interface prioritization, and similar factors. Traditional QoS parameters are throughput, delay, jitter, packet error rate, and the like.

Similarly, an aspect may reside in a mobile station 102 including a plurality of communication interfaces 302. Each communication interface may have an active power mode and an inactive power mode. The power consumption of a communication interface in the active power mode is greater than the power consumption of the communication interface in the inactive power mode. The mobile station may further include means for activating a first communication interface based on power characteristics of the first communication interface with respect to the plurality of communication interfaces, means for assessing a communication service level of the activated first communication interface for a first predetermined time period, means for deactivating the first communication interface, means for activating a second communication interface based on power characteristics of the second communication interface with respect to the plurality of communication interfaces, means for assessing a communication service level of the activated second communication interface for a second predetermined time period, and means for deactivating the second communication interface. The means for assessing a communication service level, and the means for performing a comparison of the communication service level, each may suitably include the control processor 324. The means for activating, and the means for deactivating, each may suitably include the power control module 312.

Another aspect of the invention may reside in a mobile station 102 having a control processor 324 for performing the method steps. An aspect may reside in a machine readable medium comprising instructions, the instructions when executed by the machine, cause the machine to perform operations of the method steps.

With reference to FIG. 5, another aspect of the invention may reside in method 500 of providing communication services for a mobile station 102 having a plurality of communication interfaces 302. In the method, a first communication interface and a second communication interface may be activated (step 502). A communication service level of the activated first communication interface and of the activated second communication interface is assessed (step 504). A comparison is performed of the communication service level of the first communication interface with the communication service level of the second communication interface (step 506). The first communication interface and the second communication interface are then deactivated (step 508).

Figure 7A:
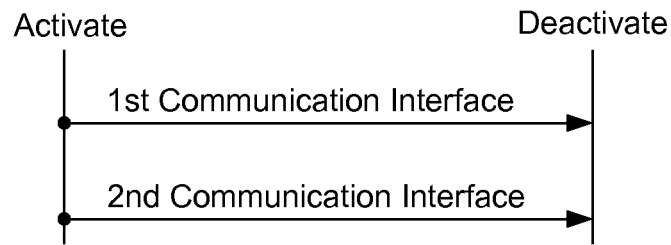
FIGS. 7A-7D are timing diagrams showing relative activation and deactivation times of the communication interfaces, in accordance with an aspect of the invention.
Figure 7B:
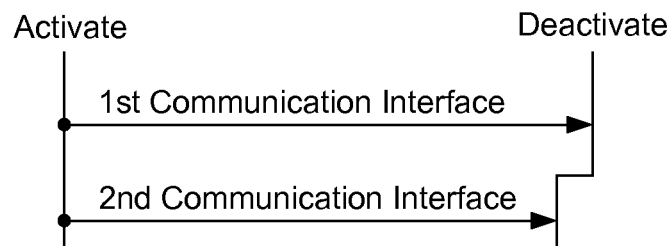
Figure 7C:
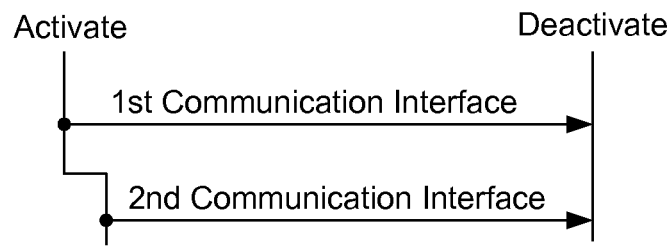

With reference to FIGS. 7A and 7B, the first and second communication interfaces 302 may be synchronously activated. Also, with reference to FIGS. 7A and 7C, the first and second communication interfaces may be synchronously deactivated.

Figure 7D:
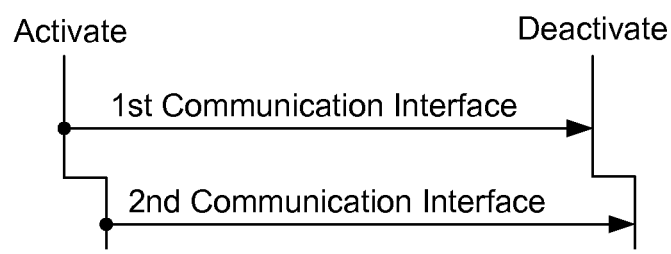

With reference to FIG. 6, an aspect of the invention also may reside in method 600 of providing communication services for a mobile station 102 having a plurality of communication interfaces 302. In the method, a first communication interface is activated and a second communication interface is asynchronously activated (step 602), as shown in FIG. 7D. A communication service level of the activated first communication interface and of the activated second communication interface is assessed (step 604). A comparison is performed of the communication service level of the first communication interface with the communication service level of the second communication interface (step 606). The first communication interface and the second communication interface are then asynchronously deactivated (step 608), as shown in FIG. 7D.

In more a detailed aspect of the invention, the activation time periods of the first and second communication interfaces 302 may be equal. Alternatively, the activation time periods of the first and second communication interfaces may not be equal. Additionally, the activation period time periods may be based on relative setup times for the first and second communications interfaces, and/or on a relative usage history for the first and second communications interfaces.

The control processor 324 may activate and assess a communication service level of a second communication interface 302 when the communication service level of the first communication interface 302 drops below a predetermined threshold, or when mobile station 102 is within a predetermined geographic area. A knowledge of which media type are active in the geographic area or neighborhood of the mobile station may be obtained using neighbor lists that are provisioned in the mobile station, that are broadcast, or that are fetched offline. Also, the control processor may repeatedly activate and assess a communication service level of the communication interfaces at fixed times periods determined only by the mobile station, or at time periods determined by communication link quality factors for communication links associated with the respective communication interfaces. Other factors may include the time required for each communication interface to monitor the link quality, the cost in power as a function of the duration that the communication interface remains active, or the relative preference of usage of each communication interface.

A variety of systems, protocols, media, and communication interfaces may be used for the mobile station 102. An exemplary list includes: GSM, GPRS, EDGE, WCDMA, HSDPA, HSUPA, CDMA2000 1X, CDMA2000 1xEV-DO, IEEE 802.11, Bluetooth, RFID, UWB, Infrared, DVB-H, MediaFLO, IEEE 802.16, IEEE 802.20, Ethernet, USB, and wireless USB.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of providing communication services for a mobile station having a plurality of communication interfaces, each communication interface having an active power mode and an inactive power mode wherein the power consumption of a communication interface in the active power mode is greater than the power consumption of the communication interface in the inactive power mode, the method comprising:
   activating a first communication interface based on power characteristics of the first communication interface with respect to power characteristics of at least one other communication interface of the plurality of communication interfaces;
   assessing a communication service level of the activated first communication interface for a first predetermined time period;
   deactivating the first communication interface; activating a second communication interface based on power characteristics of the second communication interface with respect to power characteristics of at least one other communication interface of the plurality of communication interfaces, the second communication interface different from the first communication interface by at least one of a media type and an access technique;
   assessing a communication service level of the activated second communication interface for a second predetermined time period;
   deactivating the second communication interface, wherein neither the first nor the second communication interfaces are concurrently activated during the assessings of the first and second communication interfaces;
   performing a comparison while at least one of the first and second communication interfaces is deactivated of the communication service level of the first communication interface with the communication service level of the second communication interface; and
   selecting a communication interface based on the comparison of communication service levels.

2. A method of providing communication services for a mobile station as defined in claim 1, wherein the power characteristics comprises the power consumption of the respective communication interface in comparison with the power consumption of another communication interface in the plurality of communication interfaces.

3. A method of providing communication services for a mobile station as defined in claim 1, wherein the mobile station is capable of assessing a communication service level of a communication interface in the active power mode and the mobile station is incapable of assessing a communication service level of a communication interface in the inactive power mode.

4. A mobile station comprising:
   a plurality of communication interfaces, each communication interface having an active power mode and an inactive power mode wherein the power consumption of a communication interface in the active power mode is greater than the power consumption of the communication interface in the inactive power mode;
   means for activating a first communication interface based on power characteristics of the first communication interface with respect to power characteristics of at least one other communication interface of the plurality of communication interfaces;
   means for assessing a communication service level of the activated first communication interface for a first predetermined time period;
   means for deactivating the first communication interface;
   means for activating a second communication interface based on power characteristics of the second communication interface with respect to power characteristics of at least one other communication interface of the plurality of communication interfaces, the second communication interface different from the first communication interface by at least one of a media type and an access technique;
   means for assessing a communication service level of the activated second communication interface for a second predetermined time period;
   means for deactivating the second communication interface: wherein neither the first nor the second communication interfaces are concurrently activated during the assessings of the first made second communication interfaces;
   means for performing a comparison while at least one of the first and second communication interfaces is deactivated of the communication service level of the first communication interface with the communication service level of the second communication interface; and
   means for selecting a communication interface based on the comparison of communication service levels.

5. A computer program product, comprising:
   non-transitory computer readable medium comprising:
   code for causing a computer to activate a first communication interface based on power characteristics of the first communication interface with respect to power characteristics of at least one other communication interface of the plurality of communication interfaces;
   code for causing a computer to assess a communication service level of the activated first communication interface for a first predetermined time period;
   code for causing a computer to deactivate the first communication interface;
   code for causing a computer to activate a second communication interface based on power characteristics of the second communication interface with respect to power characteristics of at least one other communication interface of the plurality of communication interfaces, the second communication interface different from the first communication interface by at least one of a media type and an access technique;
   code for causing a computer to assess a communication service level of the activated second communication interface for a second predetermined time period;
   code for causing a computer to deactivate the second communication interface and to cause neither the first nor the second communication interfaces to be concurrently activated during the assessings of the first and second communication interfaces;
   code for performing a comparison while at least one of the first and second communication interfaces is deactivated of the communication service level of the first communication interface with the communication service level of the second communication interface; and
   code for selecting a communication interface based on the comparison of communication service levels.

6. A method of providing communication services for a mobile station having a plurality of communication interfaces, each communication interface having an active power mode and an inactive power mode wherein the power consumption of a communication interface in the active power mode is greater than the power consumption of the communication interface in the inactive power mode, the method comprising:

activating a first communication interface and a second communication interface, the second communication interface different from the first communication interface by at least one of a media type and an access technique;

assessing a communication service level of the activated first communication interface and of the activated second communication interface;

deactivating the first communication interface and the second communication interface, wherein neither the first nor the second communication interfaces are concurrently activated during the assessings of the first and second communication interfaces;

performing a comparison while at least one of the first and second communication interfaces is deactivated of the communication service level of the first communication interface with the communication service level of the second communication interface; and selecting a communication interface based on the comparison of communication service levels.

7. A method of providing communication services for a mobile station as defined by claim 6, wherein the first and second communication interfaces are synchronously activated.

8. A method of providing communication services for a mobile station as defined by claim 6, wherein the first and second communication interfaces are synchronously deactivated.

9. A method of providing communication services for a mobile station as defined in claim 6, wherein the mobile station is capable of assessing a communication service level of a communication interface in the active power mode and the mobile station is incapable of assessing a communication service level of a communication interface in the inactive power mode.

10. A method of providing communication services for a mobile station as defined by claim 6, further comprising selecting a communication interface based on the comparison of communication service levels.

11. A mobile station comprising:

a plurality of communication interfaces, each communication interface having an active power mode and an inactive power mode wherein the power consumption of a communication interface in the active power mode is greater than the power consumption of the communication interface in the inactive power mode;

means for activating a first communication interface and a second communication interface, the second communication interface different from the first communication interface by at least one of a media type and an access technique;

means for assessing a communication service level of the activated first communication interface and of the activated second communication interface;

means for deactivating the first communication interface and the second communication interface, wherein neither the first nor the second communication interfaces are concurrently activated during the assessings of the first and second communication interfaces;

means for performing a comparison while at least one of the first and second communication interfaces is deactivated of the communication service level of the first communication interface with the communication service level of the second communication interface; and means for selecting a communication interface based on the comparison of communication service levels.

12. A computer program product, comprising:
non-transitory computer readable medium comprising:
code for causing a computer to activate a first communication interface and a second communication interface, the second communication interface different from the first communication interface by at least one of a media type and an access technique;

code for causing a computer to assess a communication service level of the activated first communication interface and of the activated second communication interface;

code for causing a computer to deactivate the first communication interface and the second communication interface and to cause neither the first nor the second communication interfaces to be concurrently activated during the assessings of the first and second communication interfaces;

code for causing a computer to perform a comparison while at least one of the first and second communication interfaces is deactivated of the communication service level of the first communication interface with the communication service level of the second communication interface; and code for selecting a communication interface based on the comparison of communication service levels.

13. A method of providing communication services for a mobile station having a plurality of communication interfaces, each communication interface having an active power mode and an inactive power mode wherein the power consumption of a communication interface in the active power mode is greater than the power consumption of the communication interface in the inactive power mode, the method comprising:

activating a first communication interface and asynchronously activating a second communication interface, the second communication interface different from the first communication interface by at least one of a media type and an access technique;

assessing a communication service level of the activated first communication interface and of the activated second communication interface;

asynchronously deactivating the first communication interface and the second communication interface, wherein neither the first nor the second communication interfaces are concurrently activated during the assessings of the first and second communication interfaces;

performing a comparison while at least one of the first and second communication interfaces is deactivated of the communication service level of the first communication interface with the communication service level of the second communication interface; and selecting a communication interface based on the comparison of communication service levels.

14. A method of providing communication services for a mobile station as defined by claim 13, wherein activation time periods of the first and second communication interfaces are equal.

15. A method of providing communication services for a mobile station as defined by claim 13, wherein the activation time periods of the first and second communication interfaces are not equal.

16. A method of providing communication services for a mobile station as defined in claim 13, wherein the activation period time periods are based on relative setup times for the first and second communications interfaces.

17. A method of providing communication services for a mobile station as defined in claim 13, wherein the mobile station is capable of assessing a communication service level of a communication interface in the active power mode and the mobile station is incapable of assessing a communication service level of a communication interface in the inactive power mode.

18. A method of providing communication services for a mobile station as defined by claim 13, further comprising selecting a communication interface based on the comparison of communication service levels.

19. A mobile station comprising:

a plurality of communication interfaces, each communication interface having an active power mode and an inactive power mode wherein the power consumption of a communication interface in the active power mode is greater than the power consumption of the communication interface in the inactive power mode;

means for activating a first communication interface and a second communication interface, the second communication interface different from the first communication interface by at least one of a media type and an access technique;

means for assessing a communication service level of the activated first communication interface and of the activated second communication interface;

means for deactivating the first communication interface and the second communication interface, wherein neither the first nor the second communication interfaces are concurrently activated during the assessings of the first and second communication interfaces;

means for performing a comparison while at least one of the first and second communication interfaces is deactivated of the communication service level of the first communication interface with the communication service level of the second communication interface; and means for selecting a communication interface based on the comparison of communication service levels.

20. A computer program product, comprising:

non-transitory computer readable medium comprising:

code for causing a computer to activate a first communication interface and a second communication interface, the second communication interface different from the first communication interface by at least one of a media type and an access technique;

code for causing a computer to assess a communication service level of the activated first communication interface and of the activated second communication interface;

code for causing a computer to deactivate the first communication interface and the second communication interface and to cause neither the first nor the second communication interfaces to be concurrently activated during the assessings of the first and second communication interfaces;

code for causing a computer to perform a comparison while at least one of the first and second communication interfaces is deactivated of the communication service level of the first communication interface with the communication service level of the second communication interface; and code for selecting a communication interface based on the comparison of communication service levels.

* * * * *